United States Patent
Li et al.

(10) Patent No.: US 11,318,378 B2
(45) Date of Patent: May 3, 2022

(54) METHOD FOR CONSTRUCTING MOTOR VIBRATION MODEL, METHOD AND ELECTRONIC DEVICE FOR HAPTICS IMPLEMENTATION, AND STORAGE MEDIUM

(71) Applicant: AAC Technologies Pte. Ltd., Singapore (SG)

(72) Inventors: Jianqi Li, Shenzhen (CN); Xiuyue Wang, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 40 days.

(21) Appl. No.: 16/986,294

(22) Filed: Aug. 6, 2020

(65) Prior Publication Data
US 2021/0038978 A1     Feb. 11, 2021

(30) Foreign Application Priority Data
Aug. 9, 2019   (CN) .......................... 201910735399.0

(51) Int. Cl.
*A63F 13/52*    (2014.01)
*A63F 13/285*   (2014.01)
*G06F 3/01*     (2006.01)
*G06F 17/16*    (2006.01)

(52) U.S. Cl.
CPC ............ *A63F 13/285* (2014.09); *A63F 13/52* (2014.09); *G06F 3/016* (2013.01); *G06F 17/16* (2013.01)

(58) Field of Classification Search
CPC ........ A63F 13/52; A63F 13/285; G06F 3/016; G06F 17/16
See application file for complete search history.

(56) References Cited

U.S. PATENT DOCUMENTS

| | | | | |
|---|---|---|---|---|
| 2011/0204830 A1* | 8/2011 | Kim | ...................... | H02P 25/032 318/114 |
| 2013/0127759 A1* | 5/2013 | Bae | ......................... | G06F 3/016 345/173 |
| 2015/0297990 A1* | 10/2015 | Mahlmeister | ......... | A63F 13/285 463/37 |

(Continued)

*Primary Examiner* — David L Lewis
*Assistant Examiner* — Shauna-Kay Hall
(74) *Attorney, Agent, or Firm* — W&G Law Group

(57) ABSTRACT

A method for constructing a motor vibration model is provided. In this method, a first condition combination and a second condition combination in a game scene and vibration effects corresponding to the condition combinations are received, the vibration effects including a vibration type and a vibration amplitude. The first condition combination, the second condition combination and the corresponding vibration effects may be digitally processed, respectively. A vibration type model may be constructed according to the first condition combination and the vibration type that have been digitally processed, and a vibration amplitude model may be constructed according to the second condition combination and the vibration amplitude that have been digitally processed. The vibration type model and the vibration amplitude model jointly constitute the motor vibration model. A game-scene-based haptics implementation method, an electronic device and a computer-readable storage medium are also provided.

14 Claims, 4 Drawing Sheets

(56) References Cited

U.S. PATENT DOCUMENTS

| | | | |
|---|---|---|---|
| 2016/0012687 A1* | 1/2016 | Obana | A63F 13/285 |
| | | | 340/407.1 |
| 2017/0110990 A1* | 4/2017 | Hu | H02P 5/74 |
| 2017/0331349 A1* | 11/2017 | Iino | H04M 19/04 |
| 2018/0028911 A1* | 2/2018 | Aoki | A63F 13/23 |
| 2020/0061460 A1* | 2/2020 | Nakagawa | A63F 13/215 |

* cited by examiner

METHOD FOR CONSTRUCTING MOTOR VIBRATION MODEL, METHOD AND ELECTRONIC DEVICE FOR HAPTICS IMPLEMENTATION, AND STORAGE MEDIUM

TECHNICAL FIELD

The present disclosure relates to electronic devices, and in particular, to a method for constructing a motor vibration model, a game-scene-based haptics implementation method, an electronic device, and a storage medium.

BACKGROUND

Haptics is a way to convey information. In some relatively abstract scenes without sound and picture conditions, haptics is a good choice. In the field of haptics, haptics feedback in the form of vibration is widely used in electronic products and consumer virtual products. In the field of motors, linear motors are gaining more market share due to customizability of their vibration forms.

At present, in scenes of competitive games including gun shooting, racing, fighting gams visual and auditory interaction has become common, but it is increasingly difficult to meet the needs of consumers for real experience.

Conventionally, vibration setting for different characters, different conditions and different environments in the game scenes is fixed. That is, the vibration form is unique for the condition of one or more scenes, and it would be cumbersome if one vibration effect is customized for each single condition. Moreover, because of different character scenes in the game, the vibration customized for one character scene is not reusable for another character scene and, therefore, re-customization of the vibration is needed.

Therefore, it is necessary to provide a game-scene-based haptics implementation method.

SUMMARY

In one independent aspect, a method for constructing a motor vibration model is provided. In this method, a first condition combination and a second condition combination in a game scene and vibration effects corresponding to the condition combinations are received, the vibration effects including a vibration type and a vibration amplitude. The first condition combination, the second condition combination and the corresponding vibration effects may be digitally processed, respectively. A vibration type model may be constructed according to the first condition combination and the vibration type that have been digitally processed, and a vibration amplitude model may be constructed according to the second condition combination and the vibration amplitude that have been digitally processed. The vibration type model and the vibration amplitude model jointly constitute the motor vibration model.

In one embodiment, an expression of the vibration type model may be: $Y=AX+B$, where $X$ represents the first condition combination, $Y$ represents an output vibration type combination, and $A$ and $B$ are vibration type parameters, $A$ being an $n*m$ dimensional vector, and $B$ being an $m$ dimensional vector.

In one embodiment, an expression of the vibration amplitude model is: $L=c_1k_1+c_2k_2+c_3k_3+\ldots+c_ik_i+d$, where $c_1, c_2 \ldots c_i$ and $d$ each represent a vibration amplitude parameter, and $L$ is a vibration amplitude coefficient.

In one embodiment, the vibration amplitude coefficient $L$ is a scalar quantity with a value range between 0 and 1.

In one embodiment, after the vibration amplitude model is constructed, the method may further includes digitally processing different scenes in a game, the different scenes being represented with ID=1, 2, 3, 4, 5, ... n; the different scenes having their respective vibration type models and vibration amplitude models.

In one embodiment, after the vibration amplitude model is constructed, the method may further includes digitally processing different games, the different games being represented with ID=1, 2, 3, 4, 5, ... n; the different games having their respective vibration type models and vibration amplitude models.

In another independent aspect, a computer-readable storage medium is provided which has a motor vibration model construction program stored thereon. The motor vibration model construction program is executable by at least one processor to implement a method for constructing a motor vibration model as described above.

In another independent aspect, a game-scene-based haptics implementation method generally includes acquiring a condition set of a current game scene; and inputting the condition set into a motor vibration model to obtain a motor drive signal to drive a motor to vibrate. The motor vibration model may be constructed by a method for constructing a motor vibration model as described above.

In one embodiment, before the step of acquiring the condition set of the current game scene, the game-scene-based haptics implementation method may further include, when a condition change in the current game scene is detected, acquiring a set of changed conditions.

In another independent aspect, an electronic device is provided which may generally include at least one processor and a memory in communication with the at least one processor. The memory has a game-scene-based haptics implementation program stored thereon. The game-scene-based haptics implementation program is executable by the at least one processor to implement a game-scene-based haptics implementation method as described above.

In still another independent aspect, a computer-readable storage medium is provided which has a game-scene-based haptics implementation program stored thereon. The game-scene-based haptics implementation program is executable by a processor to implement a game-scene-based haptics implementation method as described above.

In summary, in the method for construction a motor vibration model disclosed herein, a general mathematical model is established between scene conditions and output vibration signals. This addresses the problem that currently there is a unique correspondence between the conditions and the vibration effects, which can achieve more diverse vibration forms. In addition, the motor vibration model constructed using this method has an improved portability.

Independent features and/or independent advantages of this disclosure may become apparent to those skilled in the art upon review of the detailed description, claims and drawings.

BRIEF DESCRIPTION OF THE DRAWINGS

In order to explain the technical solutions of the embodiments of the present disclosure more clearly, accompanying drawings used to describe the embodiments are briefly introduced below. It is evident that the drawings in the following description are only concerned with some embodiments of the present disclosure. For those skilled in the art, in a case where no inventive effort is made, other drawings may be obtained based on these drawings.

DESCRIPTION OF THE EMBODIMENTS

The present disclosure is further described below in conjunction with the drawings and embodiments.

First Embodiment

Due to different character scenes in a game, the vibration form customized for one character scene is not reusable for another character scene and, therefore, a lot of re-customizations of vibration forms are required. Such tedious re-customizations can instead be automized by establishing a mathematical model.

Figure 1:
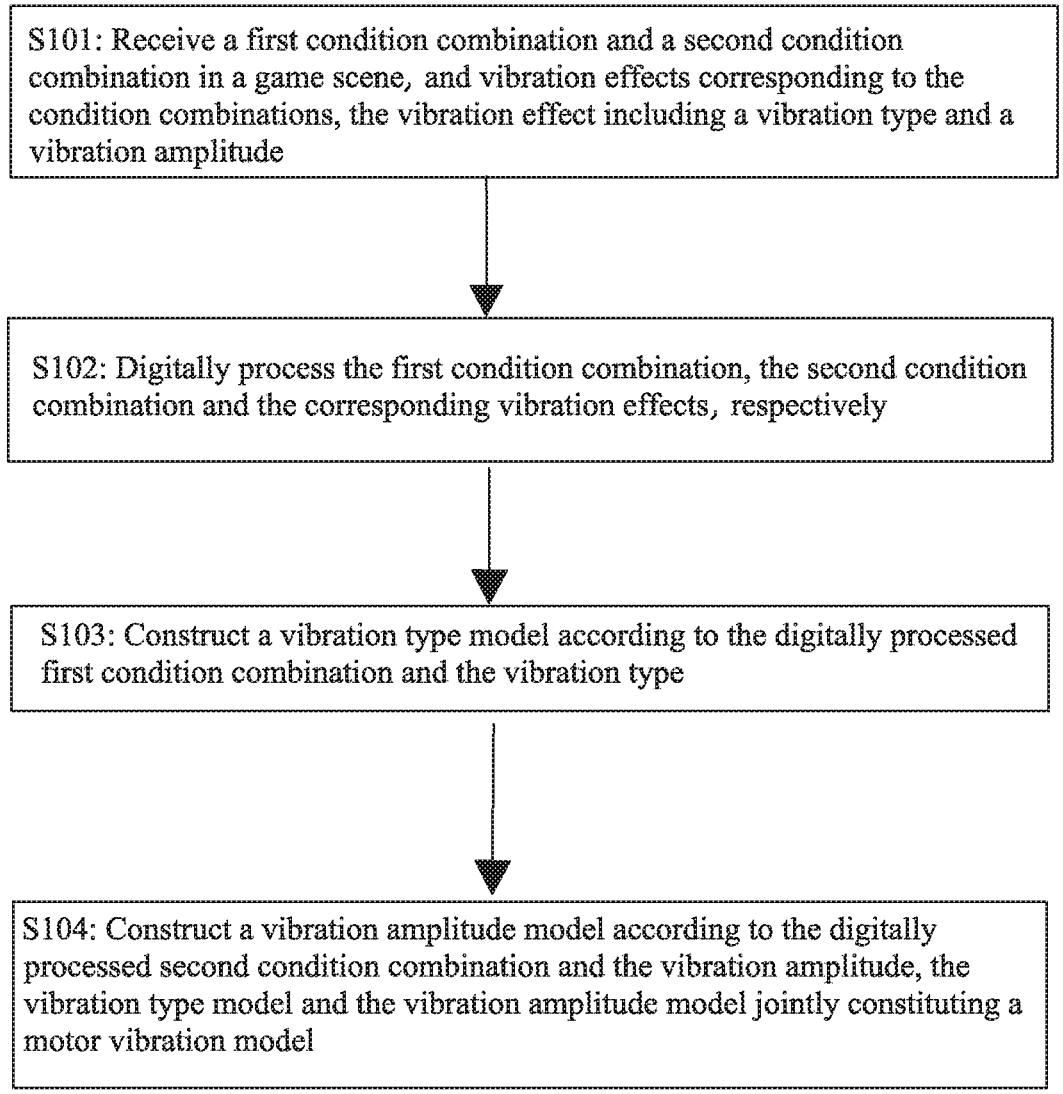
FIG. 1 is a flowchart of a motor vibration model construction method according to a first embodiment of the present disclosure.

Referring to FIG. 1, this embodiment provides a motor vibration model construction method, including the following steps.

In step S101, a first condition combination and a second condition combination in a game scene, and vibration effects corresponding to the condition combinations are received, the vibration effect including a vibration type and a vibration amplitude. In this step, the first condition combination is directed to conditions set for vibration type effects, and the second condition combination is directed to conditions set for vibration amplitude effects. It is necessary to make conditions correspond to effects, for example, vibration effects corresponding to a game character being hit on the head, and being hit on the leg are different, and vibration type effects and vibration amplitude effects are definitely different when a game character is hitting or running, so parameters need to be configured for different effects. During configuration, first of all, each condition needs to be concretized, digitized, and interpretable, and vibration effects of the motor are also digitized and become unique, so that when under exactly the same conditions, vibration effects produced are consistent; however, when the game scene changes, the vibration effects produced change accordingly.

In step S102, the first condition combination, the second condition combination and the corresponding vibration effects are digitally processed, respectively.

Figure 2:
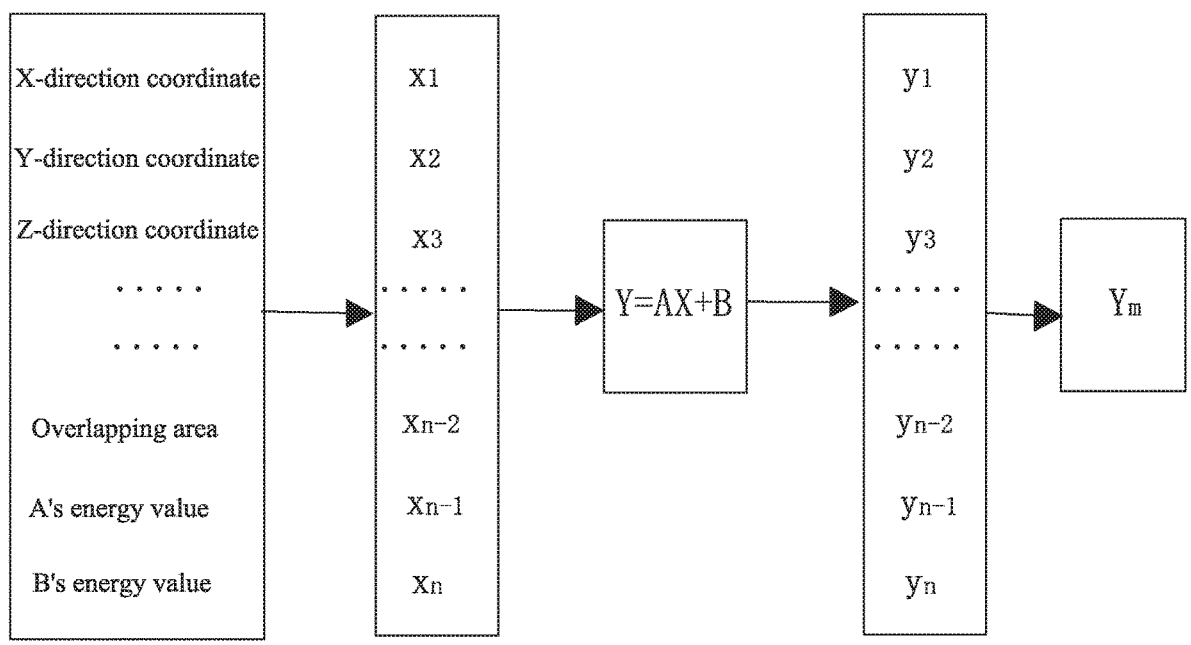
FIG. 2 is a functional block diagram illustrating a vibration type model according to the first embodiment.

In step S103, a vibration type model is constructed according to the first condition combination and the vibration type that have been digitally processed. The constructed vibration type model is specifically shown in FIG. 2.

More preferably, an expression of the vibration type model is: $Y=AX+B$, where X represents the first condition combination, Y represents an output vibration type combination, A and B are vibration type parameters, with A being an n*m dimensional vector, and B being an m dimensional vector. In the model expression $Y=AX+B$ mentioned in this embodiment, X is a vector $[x1, x2, x3 \ldots xn]$, Y is a vector $[y1, y2, y3 \ldots, ym]$, and A and B are n*m and m dimensional vectors, respectively. Through the above model expression, the number of the conditions no longer corresponds to the number of the vibration effects, and the increase in the number of the conditions no longer determines the increase in the number of vibration signals. After the model is established, it can be ported to different games, and a satisfactory accuracy can be achieved by modifying the parameters A and B. Therefore, the model has a high degree of portability, which can be ported without the need to re-establish the correspondence between conditions and effects.

Figure 3:
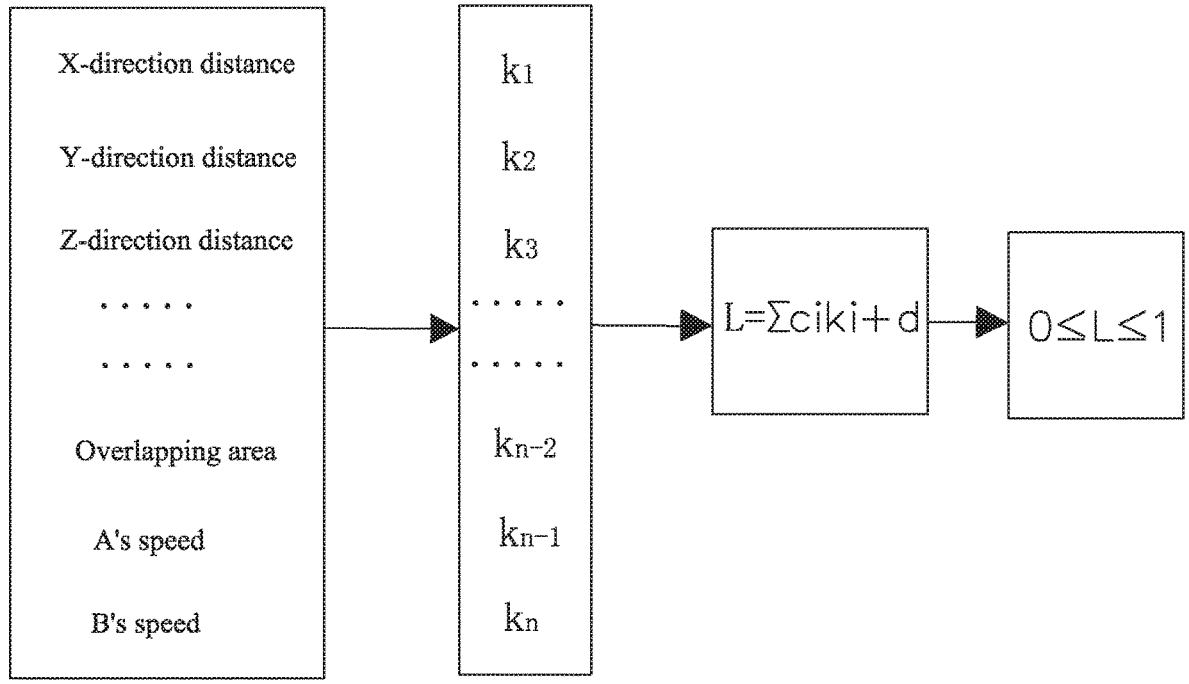
FIG. 3 is a functional block diagram illustrating a vibration amplitude model according to the first embodiment.

In step S104, a vibration amplitude model is constructed according to the second condition combination and the vibration amplitude that have been digitally processed. The vibration type model and the vibration amplitude model jointly constitute a motor vibration model, a general mathematical model established between conditions and vibration signals. The constructed vibration amplitude model is specifically shown in FIG. 3.

More preferably, an expression of the vibration amplitude model is: $L=c_1 k_1+c_2 k_2+c_3 k_3+ \ldots +c_i k_i+d$, where $c1, c2 \ldots ci$ and d all represent vibration amplitude parameters, L is a vibration amplitude coefficient, the vibration amplitude coefficient L is a scalar quantity with a range between 0 and 1. In this combination of conditions, the vibration amplitude parameter plays the leading role. In the design of the vibration amplitude parameter, the second condition combination may be consistent with the first condition combination, or the vibration amplitude may be designed by designing different condition combinations. The above steps can realize that the corresponding vibration effect may change accordingly with the change of a condition in a specific game scene.

Two problems can be solved by constructing the motor vibration model. The first problem is that conventionally the condition-vibration relationship is fixed and unique, because a vibration signal is obtained through a key-value query such that there are as many vibration signals as there are conditions; however, according to the method of this embodiment, the condition and the vibration are not in a one-to-one correspondence. The second problem is that the conventional correspondence has limitations and cannot be universally used in different situations, that is, it has poor portability; however, with the model construction of this embodiment, when the model is ported to different scenes and games, it can be adapted to the different scenes and games simply by correspondingly modifying specific parameters.

In this embodiment, the parameters of the motor vibration model, such as, the parameters A, B, $c_1, c_2 \ldots c_i$ and d, can be modified. The motor vibration model can be ported to different games by modifying these parameters.

Specifically, the motor vibration model construction method in this embodiment further includes the following step S104: digitally processing different scenes in a game, the different scenes being represented with ID=1, 2, 3, 4, 5 . . . n; the different scenes having their respective vibration type models and vibration amplitude models. That is, when there are a large number of diverse scenes in the game, the above parameters of A, B, c1, c2 . . . ci and d can be modified to allow the vibration model to be applied to the large number of diverse scenes. The scenes mentioned in this step refer to scenes such as running or swimming.

Likewise, in addition to digitally processing the scene, different games can also be digitized, the different games being represented with ID=1, 2, 3, 4, 5 n; the different games have their respective vibration type models and vibration amplitude models. The models can be more adaptive to the games by adjusting the parameters.

After the above two models are established, the models are implemented through software, and the software is packaged into the game; when the game is running, the models are loaded into the game. When a condition change in the game is detected, a corresponding motor type signal and an output amplitude of the signal can be calculated according to the digitized conditions, and are then used to drive the motor to vibrate.

Second Embodiment

The second embodiment discloses a storage medium. The storage medium is a computer-readable storage medium, on which a motor vibration model construction program is stored, the motor vibration model construction program is a computer program, and the motor vibration model construction program, when executed by a processor, implements the motor vibration model construction method described in the first embodiment.

Of course, for a storage medium including computer-executable instructions provided by an embodiment of the present disclosure, computer-executable instructions thereof are not limited to the operations in the method described above, and can also perform related operations in the method provided by any embodiment of the present disclosure.

Although the computer-executable program contained in the storage medium provided by the above embodiment of the present disclosure is executed by the processor to perform the method steps as discussed above, it should be understood that the storage medium may contain a computer-executable program that can be executed by a processor to perform other method steps provided by other embodiments of the present disclosure.

People skilled in the art can understand that all or part of the steps in the method for implementing the embodiments of the present disclosure can be completed by instructing relevant hardware through a program, or can alternatively be performed completely by hardware although the formal one may be a better way of implementation in most cases. The program is stored in a storage medium and comprises a plurality of instructions for enabling one apparatus (which may be a personal computer, a server, or a network apparatus, etc.) or a processor to execute all or part of the steps of the method disclosed herein. The storage medium comprises a USB flash disk, a mobile hard disk, a read-only memory (ROM), a random access memory (RAM), a flash memory (FLASH), a magnetic disk, an optical disk, and other medium capable of storing program codes.

Third Embodiment

Figure 4:
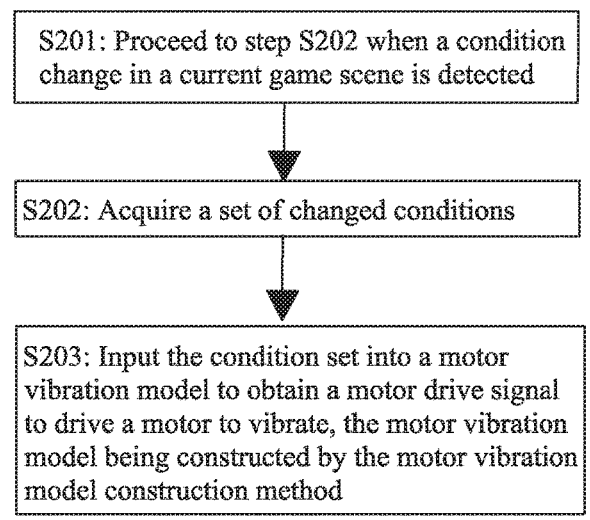
FIG. 4 is a general flowchart of a game-scene-based haptics implementation method according to a third embodiment of the present disclosure.
Figure 5:
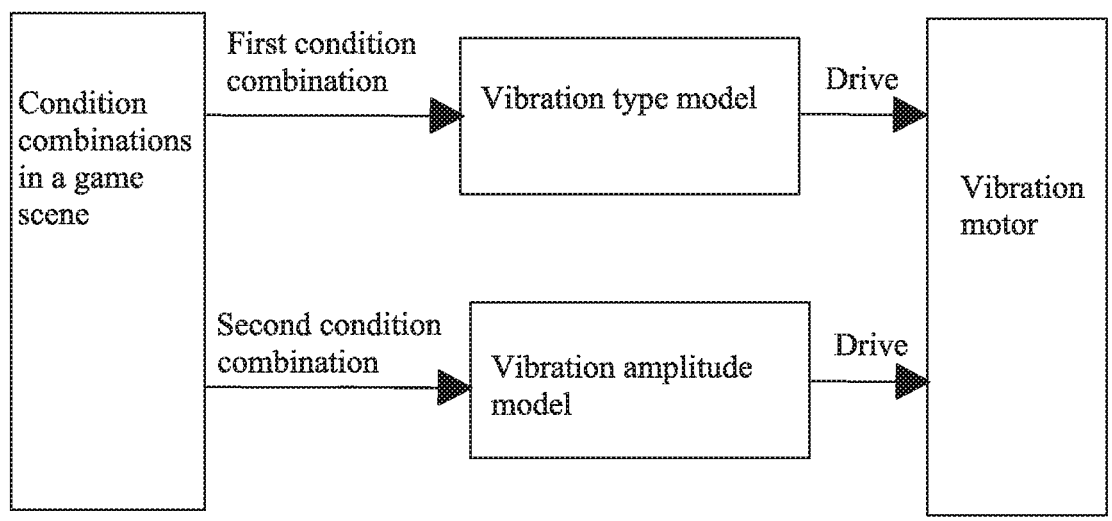
FIG. 5 is a specific flowchart of the game-scene-based haptics implementation method according to the third embodiment.

As shown in FIGS. 4 and 5, this embodiment provides a game-scene-based haptics implementation method, including the following steps.

In S201, it is detected whether various conditions in a current game scene have changed, and if yes, step S202 is performed.

In S202, a set of changed conditions is acquired.

In S203, the condition set is inputted into a motor vibration model to obtain a motor drive signal to drive a motor to vibrate, and the motor vibration model is constructed by the motor vibration model construction method described in the embodiment.

The process of this embodiment is mainly divided into two steps: a first step of determining the motor vibration signal and a second step of determining the signal amplitude. The method is described in detail below, taking a two-character fighting scene as an example, in which tactile feedback is provided when they hit each other.

In the first step of acknowledgement of the motor signal, several conditions (relative coordinates x1 (X direction), x2 (Y direction) and x3 (Z direction), distances between the two characters x4 (X direction), x5 (Y direction) and x6 (Z direction), an overlapping area of the two characters x7, energy values of the two characters x8 (character 1), x9 (character 2)) are digitized, and the conditions are combined into vectors (X1, X2, X3, etc.), numbers are used to represent the motor vibration signals (Y1, Y2, Y3, Y4, Y5, Y6) which are vector values filled with 0 and 1, for example, Y1=[1, 0, 0, 0, 0, 0], Y2=[0, 1, 0, 0, 0, 0], Y3=[0, 0, 1, 0, 0, 0], and so on. Through an expression such as Y=AX+B, where A and B are fixed values, X is inputted into the model, and Y is outputted. Y is a vector [y1, y2, y3 . . . , ym], where y1, y2, ym each represent a probability, that is, the probability of Y1, the probability of Y2, and the probability of Ym are taken, and the largest one of all the probabilities is selected as the corresponding vibration type signal.

In the step of determining the motor signal amplitude, several conditions (k1, k2, k3 . . . ki) are digitized, and the conditions in the first step, or other digitized conditions can be selected as these conditions. $L=c_1k_1+c_2k_2+c_3k_3+ \ldots +c_ik_i+d$ is established, where L is a scalar quantity with a value range between 0 and 1, which scales the corresponding signal by 0 to 1. After the corresponding motor type signal and an output amplitude of the signal are calculated, they are transmitted to the motor to drive the motor to vibrate.

Fourth Embodiment

Figure 6:
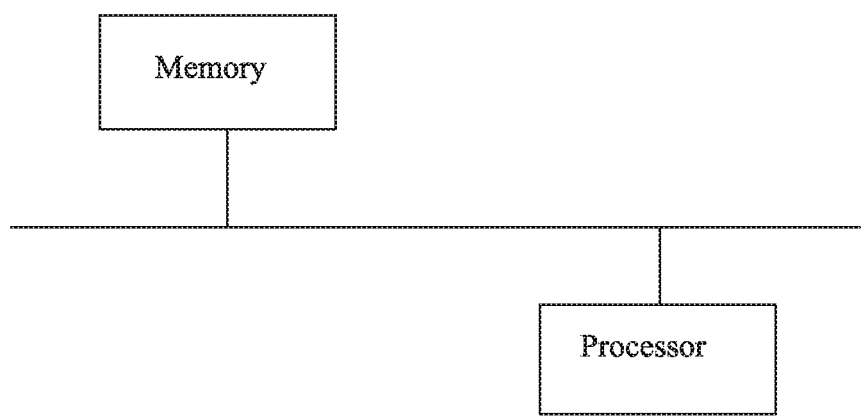
FIG. 6 is a block diagram of a circuit structure of an electronic device according to a fourth embodiment of the present disclosure.

As shown in FIG. 6, the fourth embodiment discloses an electronic device including at least one processor and a memory in communication with the at least one processor. The memory stores thereon a game-scene-based haptics implementation program executable by the at least one processor. The game-scene-based haptics implementation program is a computer program, and the at least one processor, when executing the game-scene-based haptics implementation program, implements the game-scene-based haptics implementation method described in the third embodiment. The electronic device may be, among others, one of a variety of electronic devices such as mobile phones, computers, and tablet computers.

Fifth Embodiment

The fifth embodiment discloses a storage medium. The storage medium is a computer-readable storage medium, on which a game-scene-based haptics implementation program is stored. The game-scene-based haptics implementation program is a computer program, and the game-scene-based haptics implementation program, when executed by a processor, implements the game-scene-based haptics implementation method described in the third embodiment.

Although the computer-executable program contained in the storage medium provided by the above embodiment of the present disclosure is executed by the processor to perform the method steps as discussed above, it should be understood that the storage medium may contain a computer-executable program that can be executed by a processor to perform other method steps provided by other embodiments of the present disclosure.

People skilled in the art can understand that all or part of the steps in the method for implementing the embodiments of the present disclosure can be completed by instructing relevant hardware through a program, or can alternatively be performed completely by hardware although the formal one may be a better way of implementation in most cases. The program is stored in a storage medium and comprises a plurality of instructions for enabling one apparatus (which may be a personal computer, a server, or a network apparatus, etc.) or a processor to execute all or part of the steps of the method disclosed herein. The storage medium comprises a USB flash disk, a mobile hard disk, a read-only memory (ROM), a random access memory (RAM), a flash memory (FLASH), a magnetic disk, an optical disk, and other medium capable of storing program codes.

Although the disclosure is described with reference to one or more embodiments, it will be apparent to those skilled in the art that various modifications and variations can be made to the disclosed structure and method without departing from the scope or spirit of the disclosure. In view of the foregoing, it is intended that the present disclosure cover modifications and variations of this invention provided they fall within the scope of the following claims and their equivalents.

What is claimed is:

1. A method for constructing a motor vibration model, comprising:
   receiving a first condition combination and a second condition combination in a game scene and vibration effects corresponding to the condition combinations, the vibration effects comprising a vibration type and a vibration amplitude;
   digitally processing the first condition combination, the second condition combination and the corresponding vibration effects, respectively;
   constructing a vibration type model according to the first condition combination and the vibration type that have been digitally processed; and
   constructing a vibration amplitude model according to the second condition combination and the vibration amplitude that have been digitally processed;
   wherein the vibration type model and the vibration amplitude model jointly constitute the motor vibration model,
   an expression of the vibration type model is: $Y=AX+B$, where X represents the first condition combination, Y represents an output vibration type combination, and A and B are vibration type parameters, A being an n*m dimensional vector, and B being an m dimensional vector,
   an expression of the vibration amplitude model is: $L=c_1 k_1+c_2 k_2+c_3 k_3+\ldots+c_i k_i+d$, where $c_1, c_2 \ldots c_i$ and d each represent a vibration amplitude parameter, and L is a vibration amplitude coefficient.

2. The method of claim 1, wherein the vibration amplitude coefficient L is a scalar quantity with a value range between 0 and 1.

3. The method of claim 1, wherein after the vibration amplitude model is constructed, the method further comprises digitally processing different scenes in a game, the different scenes being represented with ID=1, 2, 3, 4, 5, . . . n; the different scenes having their respective vibration type models and vibration amplitude models.

4. The method of claim 1, wherein after the vibration amplitude model is constructed, the method further comprises digitally processing different games, the different games being represented with ID=1, 2, 3, 4, 5, . . . n; the different games having their respective vibration type models and vibration amplitude models.

5. A non-transitory computer-readable storage medium having a motor vibration model construction program stored thereon, the motor vibration model construction program being executable by at least one processor to implement a method for constructing a motor vibration model, the method comprising:
   receiving a first condition combination and a second condition combination in a game scene and vibration effects corresponding to the condition combinations, the vibration effects comprising a vibration type and a vibration amplitude;
   digitally processing the first condition combination, the second condition combination and the corresponding vibration effects, respectively;
   constructing a vibration type model according to the first condition combination and the vibration type that have been digitally processed; and
   constructing a vibration amplitude model according to the second condition combination and the vibration amplitude that have been digitally processed;
   wherein the vibration type model and the vibration amplitude model jointly constitute a motor vibration model,
   an expression of the vibration type model is: $Y=AX+B$, where X represents the first condition combination, Y represents an output vibration type combination, and A and B are vibration type parameters, A being an n*m dimensional vector, and B being an m dimensional vector; and
   an expression of the vibration amplitude model is: $L=c k_1+c_2 i+c_3 k+\ldots+cik;+d$, where $ci, c_2 \ldots ci$ and d each represent a vibration amplitude parameter, and L is a vibration amplitude coefficient.

6. The non-transitory computer-readable storage medium of claim 5, wherein the vibration amplitude coefficient L is a scalar quantity with a value range between 0 and 1.

7. The non-transitory computer-readable storage medium of claim 5, wherein after the vibration amplitude model is constructed, the method further comprises digitally processing different scenes in a game, the different scenes being represented with ID=1, 2, 3, 4, 5, . . . n; the different scenes having their respective vibration type models and vibration amplitude models.

8. The non-transitory computer-readable storage medium of claim 5, wherein after the vibration amplitude model is constructed, the method further comprises digitally processing different games, the different games being represented with ID=1, 2, 3, 4, 5, . . . n; the different games having their respective vibration type models and vibration amplitude models.

9. A game-scene-based haptics implementation method, comprising:
   acquiring a condition set of a current game scene; and
   inputting the condition set into a motor vibration model to obtain a motor drive signal to drive a motor to vibrate, and the motor vibration model being constructed by a method comprising:
      receiving a first condition combination and a second condition combination in a game scene and vibration effects corresponding to the condition combinations, the vibration effects comprising a vibration type and a vibration amplitude;

digitally processing the first condition combination, the second condition combination and the corresponding vibration effects, respectively;

constructing a vibration type model according to the first condition combination and the vibration type that have been digitally processed; and constructing a vibration amplitude model according to the second condition combination and the vibration amplitude that have been digitally processed;

wherein the vibration type model and the vibration amplitude model jointly constitute the motor vibration model, an expression of the vibration type model is: $Y=AX+B$, where X represents the first condition combination, Y represents an output vibration type combination, and A and B are vibration type parameters, A being an n*m dimensional vector, and B being an m dimensional vector; and an expression of the vibration amplitude model is: $L=cik_1+cj2+c_3k_3+\ldots+c\,k+d$, where $ci, c_2 \ldots c$; and d each represent a vibration amplitude parameter, and L is a vibration amplitude coefficient which is a scalar quantity with a value range between 0 and 1.

10. The game-scene-based haptics implementation method of claim 9, wherein after the vibration amplitude model is constructed, the method further comprises digitally processing different scenes in a game, the different scenes being represented with ID=1, 2, 3, 4, 5, . . . n; the different scenes having their respective vibration type models and vibration amplitude models.

11. The game-scene-based haptics implementation method of claim 9, wherein after the vibration amplitude model is constructed, the method further comprises digitally processing different games, the different games being represented with ID=1, 2, 3, 4, 5, . . . n; the different games having their respective vibration type models and vibration amplitude models.

12. The game-scene-based haptics implementation method of claim 9, wherein before the step of acquiring the condition set of the current game scene, the game-scene-based haptics implementation method further comprises:

when a condition change in the current game scene is detected, acquiring a set of changed conditions.

13. An electronic device, comprising:

at least one processor; and a memory in communication with the at least one processor, the memory having a game-scene-based haptics implementation program stored thereon, the game-scene-based haptics implementation program being executable by the at least one processor to implement the game-scene-based haptics implementation method of claim 9.

14. A non-transitory computer-readable storage medium having a game-scene-based haptics implementation program stored thereon, the game-scene-based haptics implementation program being executable by a processor to implement the game-scene-based haptics implementation method of claim 9.

* * * * *